United States Patent Office 2,832,802
Patented Apr. 29, 1958

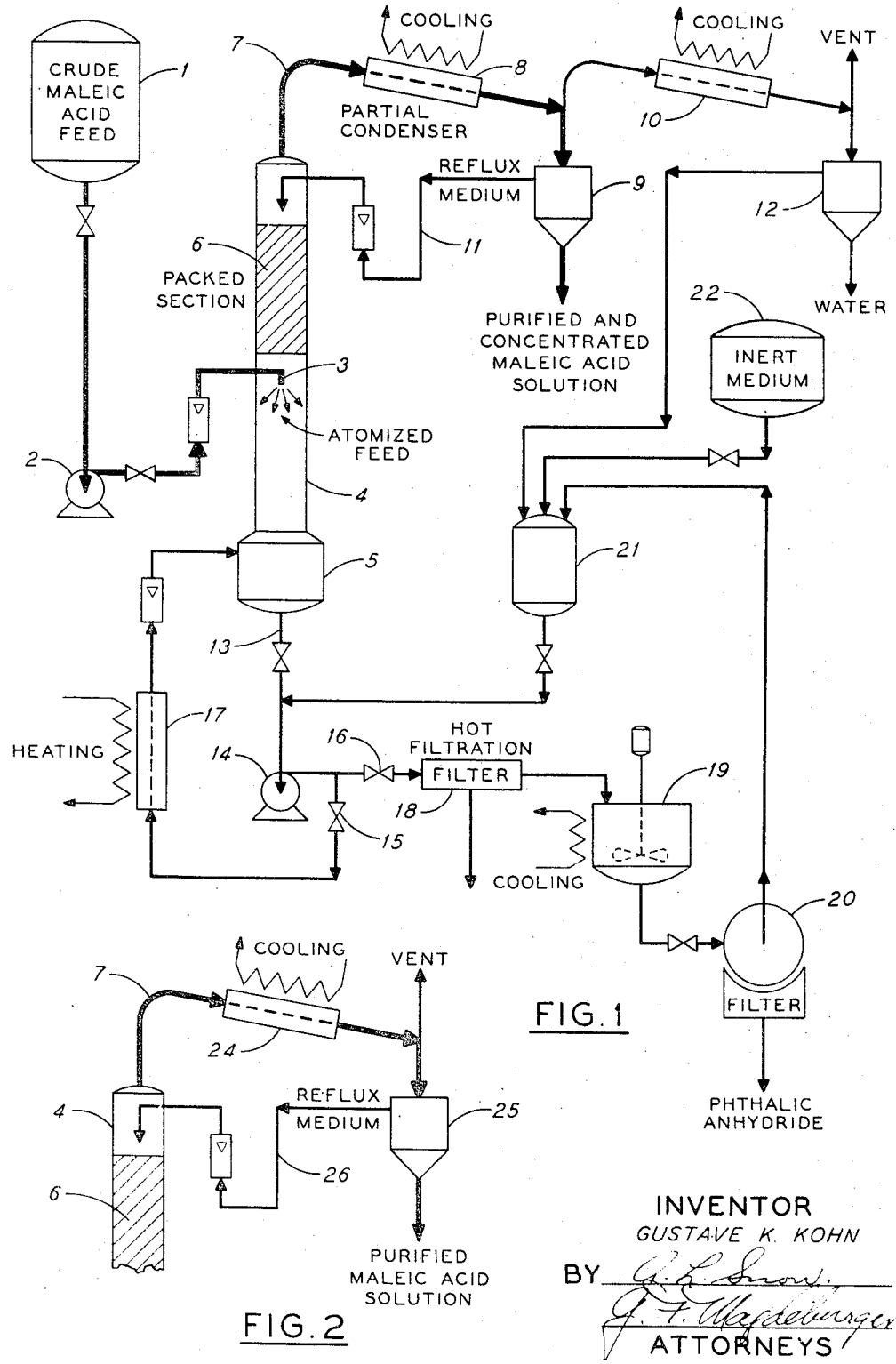

2,832,802
RECOVERY OF PURIFIED MALEIC ACID

Gustave K. Kohn, Berkeley, Calif., assignor to California Spray-Chemical Corporation, Richmond, Calif., a corporation of Delaware Application September 7, 1954, Serial No. 454,430

3 Claims. (Cl. 260—537)

This invention relates to a new and improved process for treating aqueous solutions of crude or impure maleic acid to separate the maleic acid from the associated organic and inorganic impurities with simultaneous conversion of the maleic acid to maleic acid anhydride, hereinafter referred to as "maleic anhydride."

In the catalytic vapor phase oxidation of organic compounds containing at least 4 carbon atoms, maleic anhydride is produced as a primary or secondary oxidation product, depending upon the type of organic compound oxidized. The gaseous oxidation products may be processed and recovered by a variety of methods, and frequently include an aqueous absorption system in whole or in part to yield a product or by-product aqueous stream containing maleic acid.

Where the primary oxidation product is maleic acid, the aqueous product stream contains a high concentration of maleic acid which may be crystallized to recover the gross maleic acid and yield a residual stream of low maleic acid content and associated with residual oxidation products. Again where maleic anhydride is an incidental oxidation product, the aqueous absorption stream likewise contains the comparatively low concentration of maleic acid associated with multiple residual oxidation products.

The difficulties in recovery of the maleic acid from the residual or by-product aqueous streams have long been recognized in the prior art. The conventional methods of recovery are rendered ineffective or totally inoperative by reason of the heterogeneous composition and concentration of the associated impurities which, in fact, vary with the charge and reaction variables of the oxidation process.

The recovery of maleic acid from aqueous solutions thereof may be effected by codistillation with an aromatic solvent at elevated temperatures such that the maleic acid is dehydrated to maleic anhydride, and the water of solution and water of hydration are removed overhead as a binary mixture with the aromatic solvent while retaining the maleic anhydride in the still bottoms. However, when any appreciable concentrations of associated oxidation products are contained in the maleic acid stream, such as aldehydes, ketones, phenolic and quinoidal compounds, unsaturated acids, etc., they tend to polymerize and react together and with maleic anhydride at the distillation temperatures, resulting in the formation of tarry products in the still bottoms which are extremely difficult to separate from the maleic anhydride without appreciable loss in yield.

In addition to the reactivity of the associated oxidation products, another factor, peculiar to the aqueous recovery systems, has been determined to be of major significance in the decomposition and loss of yield of maleic anhydride. It has been established that maleic anhydride decomposes with the evolution of carbon dioxide at elevated temperatures when in the presence of relatively small concentrations of alkali metal salts. This decarboxylation of maleic anhydride is a reaction which proceeds at a significant rate even at temperatures as low as about 160° C. and increases in rate with increasing temperature. Additionally, the presence of water increases the rate of decarboxylation over that of the dry salts.

The alkali metal cations are normally introduced through the water employed in the recovery system and are concentrated by the inherent evaporation and cycling of the absorption stream. Generally, for every volume of water remaining in the absorption stream, fifteen volumes of water disappear as vapor during the absorption of the gaseous oxidation products. It is readily apparent that, even when employing waters containing a low concentration of alkali metal cations as the absorbing medium for the absorption system, the concentration due to inherent evaporation raises the alkali metal content to a level sufficient to effect a material decomposition of maleic anhydride. Concentrations of alkali metal salt (calculated as NaCl) as low a 0.005 percent by weight or 50 p. p. m. of the feed have been found effective to decarboxylate maleic anhydride at elevated temperatures.

The foregoing difficulties attendant the recovery of maleic anhydride from aqueous solutions of crude maleic acid have now been overcome by the development of a unique separation process which involves a simultaneous dehydration of maleic acid and separation of the resulting maleic anhydride from the alkali metal salts and the associated residual oxidation products. By operating in accordance with the subject process, the reaction tendencies of the associated oxidation products and the decomposing effect of the alkali metal salts are materially reduced by absorption in an inert medium under conditions which minimize the contact of the reactive impurities with the formed maleic anhydride.

The process of the invention basically involves the introduction of an aqueous solution of crude maleic acid containing alkali metal cations into contact with a body of an inert medium comprising high-boiling, saturated aliphatic hydrocarbons at a temperature of at least 170° C. and at a rate not greater than the rate of conversion of maleic acid to maleic anhydride, whereby the maleic acid is dehydrated to maleic anhydride and the resulting maleic anhydride is flash distilled from the alkali metal salts and other associated impurities which are absorbed and retained in the main body of the inert medium. The aqueous maleic acid stream is brought into contact with the hot inert medium under conditions such that contact between the formed maleic anhydride and the liquid phase portion of the inert medium containing the absorbed impurities is maintained at a minimum in order to prevent decomposition and loss of yield of the maleic anhydride. Although these conditions may be met by introduction of the aqueous maleic acid stream directly beneath the liquid surface of a body of saturated aliphatic hydrocarbons boiling in the range of 180° to 400° C. maintained at or near their boiling point, it is preferred to introduce the maleic acid stream into a distillation column in contact, and desirably countercurrent contact, with the vapor phase of the inert medium which is maintained under reflux conditions.

Of major importance to the operation of the subject process is the use of an inert medium comprising a high-boiling, saturated aliphatic hydrocarbon as the absorbent for the alkali metal salts and organic impurities, as well as the heat source for the dehydration of the maleic acid and flash distillation of the resulting maleic anhydride. These saturated aliphatic hydrocarbons may be either open-chain hydrocarbons such as the alkanes, or the cyclic hydrocarbons such as the cycloalkanes or naphthenes which may be employed as individual compounds or narrow boiling synthetic or natural mixtures thereof.

Generally, the saturated aliphatic hydrocarbons which may be employed as the inert flash distillatiton medium are those containing at least 10 carbon atoms, such as the alkyl-substituted cyclopentanes and cyclohexanes, etc. and the straight- and branched-chain alkanes. Although the use of individual hydrocarbons of desired boiling point will allow a more efficient fractionation and separation of the maleic anhydride, it has been found practical to employ a narrow fraction of aliphatic hydrocarbons taken from petroleum distillate oils derived from paraffinic or naphthenic base crudes. Preferably, such petroleum fractions should possess an unsulfonated residue of at least 92 percent in order to assure substantial distillation stability. When employing a petroleum fraction such as a kerosene cut as the inert medium, caution should be observed in controlling the vapor and reflux temperatures in the distillation column to prevent excessive isomerization to fumaric acid and hold-up of maleic anhydride in the column while on the other hand avoid excessive carry-over of impurities and distillation medium.

Although the invention process may be applied to any aqueous product or by-product streams containing maleic acid in solution, its processing merits are particularly pronounced in the treatment of a residual aqueous stream resulting from the catalytic vapor phase oxidation of an orthoxylene feed after recovery of phthalic anhydride and phthalic acid. A typical analysis of the solid organic constituents of such residual stream is as follows:

*Analysis on dry basis*

| | Percent |
|---|---|
| Maleic anhydride (calc. from acid) | 62.2 |
| Phthalic anhydride | 5.8 |
| Fumaric acid | 1.0 |
| Associated organics (aldehydes, ketones, acids, phenols, quinones, etc.) | 32.0 |

Depending upon the operating variables in the phthalic acid recovery system, the concentration of maleic acid in the residual aqueous stream will usually vary from 5 to 40 percent by weight. The aqueous component of the residual streams contain varying concentrations of alkali metal cations, again depending upon the operating variables of the phthalic acid recovery system. A typical analysis of the cations in a residual aqueous maleic acid stream is as follows:

| | P. p. m. |
|---|---|
| Na | 400 |
| Al | 4 |
| Ca | 240 |
| Cr | 28 |
| Cu | 2 |
| Fe | 200 |
| Pb | 11 |
| Mg | 90 |
| Mn | 4 |
| Ni | 15 |
| Si | 18 |
| Va | 7 |

Aside from the cations normally present in the water, other cations are undoubtedly introduced into the absorbing medium from sources such as corrosion, catalyst, air pollutants, etc.

In applying the process of the invention to a crude aqueous maleic acid stream such as the aforementioned, reference is made to the specific embodiment represented in Figures 1 and 2. These embodiments of the invention process are set forth for the purpose of illustration and are not to be construed as a limitation to the basic concept of the invention.

Following the flow diagram of Figure 1, the crude liquid maleic acid solution may be introduced directly from the primary aqueous recovery system or from a storage tank 1. The feed is metered into distillation column 4 at a determined rate and controlled temperature of about 170° to 180° C. The rate of introduction is so adjusted and maintained such that it is not greater than the rate of conversion of the maleic acid to maleic anhydride in the column, thereby preventing a build-up of maleic acid in the liquid phase bottom 5 of the distillation column.

At the introduction of the feed into the column, the feed is introduced in dispersed form as through an atomizer 3 at a point well above the liquid level in the column. The distillation column is meanwhile charged with the inert medium from storage tank 22 and make-up tank 21 which, for the purpose of present illustration, is a saturated aliphatic hydrocarbon fraction derived from petroleum and possessing a boiling range of 180° to 270° C. This kerosene cut is maintained in a reflux heat balance by maintaining the temperature in the distillation pot 5 at 220° to 230° C. through a reboiler arrangement involving pump 14 and heat exchanger 17.

The distillation column contains a packed section 6 above the introduction of the atomized feed, followed by a vapor draw-off 7 and a partial or hot condenser 8. The temperature distribution in the distillation column is maintained such that the exit vapor temperature from the distillation column is maintained at approximately 140° to 150° C. As previously mentioned, lower temperatures promote the isomerization to fumaric acid and cause a build-up of maleic acid in the column. Temperatures above 150° C. are to be avoided when employing a comparatively low-boiling inert medium and a feed containing appreciably associated oxidation products since the higher temperatures will allow a carry-over of excessive quantities of inert medium and associated oxidation products.

A control of the temperature gradient within the distillation column is achieved by the introduction of controlled amounts of cooled reflux medium 11 into the top of the column. The vapor effluent from the distillation column consists of maleic anhydride, water vapor and some entrained distillation medium. This effluent vapor is introduced to a partial or hot condenser 8 for fractional condensation of maleic anhydride and entrained distillation medium. The cooled maleic anhydride combines with water vapor to form a maleic acid solution which is drawn off in separatory vessel 9. The residual vaporized water and light ends from the distillation medium are then condensed in condenser 10 and introduced to water separator 12 where any residual distillation medium is separated from the water and returned to the make-up tank 21.

When starting with a crude maleic acid feed containing approximately 22 percent maleic acid, the partial or hot condensation embodied in Figure 1 will allow the concentration and purification to an approximately 40 percent maleic acid solution. Higher concentrations may be obtained but are not desirable due to crystallization difficulties. A slight loss of yield of maleic acid may be occasioned by reason of the carry-over of entrained maleic anhydride vapors into condenser 10 and separator 12. To conserve this entrained maleic acid, the aqueous solution separated and withdrawn from separator 12 may be recycled to the primary oxidation absorption system and incorporated with the aqueous absorption medium.

As an alternate recovery system for purified maleic acid solution, Figure 2 embodies a single-stage complete condensation of the effluent vapors from distillation column 4. In this embodiment, the vaporized maleic anhydride water vapor and entrained distillation medium are introduced through line 7 into condenser 24 wherein all but the fixed vapors are condensed and dropped out into separatory vessel 25. In separatory vessel 25, the purified maleic acid solution is separated from the condensed distillation reflux medium which is returned through line 26 and metered into the top of the distillation column 4 as a temperature control in the column. The resultant maleic acid solution drawn off of either separatory vessels 9 or 25 in Figures 1 and 2 is a substantially pure maleic acid solution freed from associated oxidation products and metal cations which may be further processed by azeotropic distillation or other conventional means.

An additional unique feature of the subject flash distillation process employing as the inert distillation medium the high-boiling, saturated aliphatic hydrocarbons is the fact that the associated salts and polymeric materials are coagulated in the liquid phase portion of the distillation system and are easily separated from the distillation medium by hot filtration. Other associated oxidation products are also retained in solution in the liquid phase portion of the distillation medium and may be recovered in substantially pure form. For the purpose of this secondary recovery, the liquid phase portion of the distillation medium contained in the distillation bottoms 5 is drawn off through line 13, and a portion of the recycle stream to reboiler 17 is intermittently drawn off through valve 16 and introduced to hot filtration in filter 18 which is maintained at approximately 200° C. The coagulated polymeric materials and metal salts are separated from the solution and the filtrate is then introduced into a cooling crystallizer 19 wherein the filtrate is cooled to approximately atmospheric temperature. In crystallizer 19, the associated oxidation products consisting primarily of phthalic anhydride are crystallized out of solution and the resulting slurry is introduced to a drum filter 20 for separation of the phthalic anhydride crystals. The remaining filtrate is then returned to the make-up drum 21 from which it is recycled into the reboiler stream.

As a specific example of the operation of the subject process, approximately 3 gallons of a kerosene cut boiling in the range of 180° to 270° C. were charged to a stainless steel 5-gallon distillation unit which was heated by external electrical units. The distillation column employed was a glass pipe column approximately 4 inches in diameter and 10 feet high, in which the feed point was set 3 feet above the still. The vapor line at the top of the column led to a stainless steel condenser followed by a water separator with a return line for the kerosene reflux. The column was unpacked from the point of entrance of the feed to the still and contained Raschig ring packing above the feed point to the return line with thermocouples placed at key points throughout the system.

A crude aqueous maleic acid charge obtained from the secondary recovery from the phthalic anhydride plant and containing approximately 22 percent maleic acid was employed as the feed. The color of the feed was an opaque brown-black containing 8 percent solids in addition to the maleic acid. In this run, in which 57 kilograms of feed were processed, substantially quantitative recovery of maleic acid was obtained varying in concentration from 22 to 40 percent maleic acid. When the higher concentrations were obtained, the recovery includes the maleic acid taken from both separators 9 and 12. The recovered maleic acid solution was a clear, almost white solution with some evidences of iron and chromium due to corrosion in the stainless steel condenser. With the recycle of the kerosene distillation medium, and the separation of approximately 500 grams phthalic anhydride, no evidence of decomposition of the kerosene was noted. Approximately 95 percent recovery of distillation medium was obtained in the system. The distillation column was run at temperatures of 220° to 230° C. in the distillation pot, 170° to 180° C. at the entrance of the feed, and 145° to 150° C. at the vapor line draw-off at the top of the column.

Obviously, many modifications and variations of the invention, as hereinbefore set forth, may be made without departing from the spirit and scope thereof, and therefore only such limitations should be imposed as are indicated in the appended claims.

I claim:

1. A method of treating an aqueous solution of maleic acid containing associated impurities and alkali metal cations which comprises introducing said aqueous solution of maleic acid into contact with an inert liquid composed of saturated aliphatic hydrocarbons boiling in the range of 180° to 400° C., maintaining said inert liquid at reflux temperatures, introducing said aqueous solution of maleic acid at a rate not greater than the rate of conversion of maleic acid to maleic anhydride, withdrawing and at least partially condensing the resulting vapor phase mixture of maleic anhydride and water and recovering a purified maleic acid solution.

2. A method of converting maleic acid in an aqueous solution thereof containing alkali metal cations to maleic anhydride without appreciable decomposition of the maleic anhydride which comprises introducing said aqueous solution of maleic acid into countercurrent contact with the vapor phase portion of an inert liquid maintained under reflux conditions, said inert liquid comprising saturated aliphatic hydrocarbons boiling in the range of 180° to 400° C., whereby the maleic acid content of said aqueous solution is converted to vapor phase maleic anhydride and the alkali metal cations are retained within the body of said inert liquid, withdrawing and at least partially condensing the resulting vapor phase mixture of maleic anhydride and water and recovering a purified maleic acid solution.

3. A method of treating an aqueous solution of maleic acid in the presence of alkali metal cations which comprises introducing an aqueous solution of maleic acid containing alkali metal cations into contact with an inert liquid composed of saturated aliphatic hydrocarbons boiling in the range of 180° to 400° C., maintaining said inert liquid at a temperature of at least 170° C., introducing said aqueous solution of maleic acid at a rate not greater than the rate of conversion of the maleic acid to maleic anhydride, withdrawing and at least partially condensing a vapor phase mixture of maleic anhydride and water and recovering a purified maleic acid solution.

References Cited in the file of this patent
UNITED STATES PATENTS

| Number | Name | Date |
| --- | --- | --- |
| 1,424,138 | Bailey | July 25, 1922 |
| 2,129,166 | Crowell | Sept. 6, 1938 |
| 2,140,140 | Punnett | Dec. 13, 1938 |
| 2,250,091 | Campbell et al. | July 22, 1941 |
| 2,340,490 | Porter | Feb. 1, 1944 |
| 2,670,355 | Barsky et al. | Feb. 23, 1954 |
| 2,683,110 | Rousseau | July 6, 1954 |
| 2,696,489 | Adams et al. | Dec. 7, 1954 |
| 2,729,599 | Ohsol et al. | Jan. 3, 1956 |
| 2,734,854 | Ospenson | Feb. 14, 1956 |